United States Patent
Giger (10) Patent No.: US 10,187,567 B2
(45) Date of Patent: Jan. 22, 2019

(54) METHOD AND HANDHELD DISTANCE MEASUREMENT DEVICE FOR INDIRECT DISTANCE MEASUREMENT BY MEANS OF IMAGE-ASSISTED ANGLE DETERMINATION FUNCTION

(71) Applicant: LEICA GEOSYSTEMS AG, Heerbrugg (CH)

(72) Inventor: Kurt Giger, Rüthi (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 326 days.

(21) Appl. No.: 14/404,600

(22) PCT Filed: May 28, 2013

(86) PCT No.: PCT/EP2013/060927
§ 371 (c)(1),
(2) Date: Nov. 28, 2014

(87) PCT Pub. No.: WO2013/178609
PCT Pub. Date: Dec. 5, 2013

(65) Prior Publication Data
US 2015/0109407 A1    Apr. 23, 2015

(30) Foreign Application Priority Data
May 29, 2012    (EP) .................................... 12169729

(51) Int. Cl.
G01S 17/46    (2006.01)
G06T 7/70    (2017.01)
(Continued)

(52) U.S. Cl.
CPC ....... H04N 5/23238 (2013.01); G01S 17/023 (2013.01); G01S 17/08 (2013.01);
(Continued)

(58) Field of Classification Search
CPC ... G01S 17/023; G01S 17/46; H04N 5/23238; G06T 7/004
(Continued)

(56) References Cited

U.S. PATENT DOCUMENTS 5,815,251 A    9/1998    Ehbets et al.
7,580,117 B2    8/2009    Okada et al.
(Continued)

FOREIGN PATENT DOCUMENTS

CN    101034160 A    9/2007
CN    101241182 A    8/2008
(Continued)

OTHER PUBLICATIONS

DE102006054324 Publication Date: May 21, 2008.*
European Search Report dated Aug. 27, 2012 as received in Application No. EP 12 16 9729.

*Primary Examiner* — Thai Q Tran
*Assistant Examiner* — Jose M Mesa
(74) *Attorney, Agent, or Firm* — Maschoff Brennan (57) ABSTRACT

Some embodiments include determining geometrical data in a space, with a measurement sequence having a measurement of a first distance to a first target point by emitting a laser beam in a first emission direction, and a measurement of a second distance to a second target point by emitting a laser beam in a second emission direction. In some embodiments the geometrical data comprises a distance between the two target points and/or a solid angle between the first emission direction and the second emission direction. Some embodiments include detecting a series of images; relating the detected images to one another using image processing and using the at least one common image area; determining a distance between the mappings of the target points in the images put in relationship with one another; and determining the geometrical data on the basis of the distance between the mappings.

18 Claims, 8 Drawing Sheets

(51) Int. Cl.
  *G01S 17/08* (2006.01)
  *H04N 5/232* (2006.01)
  *G01S 17/02* (2006.01)

(52) U.S. Cl.
  CPC .............. *G01S 17/46* (2013.01); *G06T 7/70* (2017.01); *G06T 2207/10004* (2013.01); *G06T 2207/10028* (2013.01)

(58) Field of Classification Search
  USPC .......................................... 348/36
  See application file for complete search history.

(56) References Cited

U.S. PATENT DOCUMENTS

| | | | |
|---|---|---|---|
| 7,742,176 B2 | 6/2010 | Braunecker et al. | |
| 9,600,863 B2* | 3/2017 | Xiong | G06T 3/60 |
| 2007/0064246 A1* | 3/2007 | Braunecker | G01C 15/002 356/614 |
| 2011/0216159 A1* | 9/2011 | Yoshizumi | H04N 5/225 348/36 |
| 2011/0288818 A1* | 11/2011 | Thierman | G01B 11/00 702/159 |
| 2012/0105825 A1 | 5/2012 | Gogolla et al. | |
| 2014/0015919 A1* | 1/2014 | Lynch | G01C 3/00 348/36 |

FOREIGN PATENT DOCUMENTS

| | | |
|---|---|---|
| CN | 101776757 A | 7/2010 |
| DE | 102 14 742 A1 | 10/2003 |
| DE | 10 2006 054324 A1 | 5/2008 |
| DE | 10 2007 043 496 A1 | 3/2009 |
| DE | 10 2010 043136 A1 | 5/2012 |
| EP | 0 738 899 A1 | 10/1996 |
| EP | 0 701 702 B1 | 2/1997 |
| EP | 1 517 117 A1 | 3/2005 |
| JP | 2008 116 249 A | 5/2008 |
| WO | 02/50564 A2 | 6/2002 |
| WO | 2008058788 A1 | 5/2008 |

* cited by examiner

METHOD AND HANDHELD DISTANCE MEASUREMENT DEVICE FOR INDIRECT DISTANCE MEASUREMENT BY MEANS OF IMAGE-ASSISTED ANGLE DETERMINATION FUNCTION

FIELD OF THE INVENTION

The present invention relates to a method for indirectly determining distances with a handheld distance measurement device by means of two directly measured distances and an angle, wherein the angle is ascertained from a panoramic image captured by a camera of the distance measurement device. The invention additionally relates to a handheld distance measurement device comprising a distance measuring unit and a camera for performing the method according to the invention.

In order to perform the method according to the invention, at the same time as a measurement of the distance to two spatial points, by an image acquisition unit, images of the surroundings of the spatial points are captured, which are joined together to form a single panoramic image by means of image stitching or are related to one another in some other way, such that a number of pixels between the two spatial points can be ascertained from the images combined with one another. An angle can be ascertained from said number of pixels. The sought distance between the two spatial points can be calculated by means of the cosine law. For this purpose, a handheld distance measurement device according to the invention comprises an image acquisition unit having at least one camera and an image evaluation unit for joining together the images and for ascertaining the number of pixels.

BACKGROUND

Methods and systems for distance measurement are used in many applications. Examples thereof include markedly precise measurements in geodetic applications, but also measurement tasks in the region of building installation or for industrial process controllers.

Stationary, movable or else handheld distance measurement devices are used for these tasks, and perform an optical distance measurement with respect to a selected measurement point. In this case, usually a laser beam is emitted and, after reflection at the target, is received again and evaluated. In this case, various measurement principles are available for determining the distance, such as e.g. phase or time-of-flight measurement.

Particularly in the field of building installation or acceptance of construction work, portable and handheld devices are used which are placed in relation to a structure to be measured and then carry out a distance measurement with respect to a surface. A typical handheld distance measurement device suitable for such applications is described for example in EP 0 738 899 and EP 0 701 702.

Since a measurement point that is visible on the surface to be measured is advantageous for most applications, red lasers are usually used as radiation sources for the distance measurement. In conjunction with great ease of handling, accuracies down to the millimeters range can be achieved with rangefinders in the prior art. Currently obtainable handheld distance measurement devices can carry out measurements from one point to another point to which there is a line of sight. If the target is concealed, horizontal mass can also be ascertained by means of an inclination sensor.

One possibility for determining a distance between two points, which can also be used if there is no line of sight between the points, is calculation by means of trigonometry. This is already known sufficiently from ground-based surveying devices, such as theodolites or total stations.

For trigonometrically ascertaining a distance a between two spatial points B and C, it suffices to know the distance to these two points from a third point A, and the angle α at point A between the sides b and c in the direction of the points B and C. The length of a can then be calculated by means of the cosine law:

$$a = \sqrt{b^2 + c^2 - 2 \cdot b \cdot c \cdot \cos\alpha}$$

Although a conventional handheld distance measurement device from the prior art makes it possible to measure the distances b and c to the spatial points B and C exactly, a function for accurately and reliably determining the angle α is generally missing. Acceleration sensors that can be used expediently nowadays in handheld distance measurement devices, in particular with regard to price and size, cannot yield a sufficiently reliable value for α for distance calculation purposes, and compasses are susceptible to disturbance particularly in interiors of buildings; at best angles in the vertical can be ascertained with sufficient accuracy and reliability by means of inclination sensors.

The prior art describes various solutions with handheld distance measurement devices comprising laser rangefinders by means of which two points can be targeted simultaneously, wherein an angle between the emission directions of the two lasers can be determined.

Both of the documents DE 10 2007 043 496 A1 and JP 2008 116 249 A in each case disclose a handheld distance measurement device comprising two laser rangefinders that are rotatable relative to one another, wherein the angle between said rangefinders can be determined.

DE 102 14 742 A1, by contrast, describes a solution with two handheld distance measurement devices which are connected to one another pivotably, wherein the mechanical connection between the two distance measurement devices has means for detecting the angle.

SUMMARY

What is disadvantageous about all these solutions is, in particular, the increased material outlay, since in each case two laser measurement modules or even two complete distance measurement devices are necessary for measurement purposes.

Some embodiments of the present invention provide an improved handheld distance measurement device which makes it possible to determine distances between remote points.

Some embodiments of the invention provide such a distance measurement device with a lower structural outlay, and in particular without the need to clamp the distance measurement device into a separate angle measurement apparatus.

Some embodiments of the invention provide such a handheld distance measurement device which is equipped with only a single laser rangefinder.

The handheld distance measurement device of the present invention is able to detect solid angles, thereby making it possible to ascertain an accurate distance between two successively measured target points by means of simple trigonometric calculation. For this purpose, a handheld distance measurement device according to the invention has an image acquisition unit and an image evaluation unit, by means of which images of the measurement region can be acquired and evaluated in relation to a solid angle.

The handheld distance measurement device according to the invention contains a distance measurement module for measuring the distance to target points located on surfaces. The distance measurement module is preferably a laser rangefinder that emits a, more particularly visible, laser beam in the direction of a point to be measured. For this purpose, the laser rangefinder has an optical unit, for example incorporated into the housing of the distance measurement device. For optically measuring the distance to a surface, the apparatus emits optical emission rays in the form of a beam that are modulated by means of the optical unit toward the surface. A portion of those rays of the emission rays which are reflected from the surface are collected again by the optical unit and evaluated electronically for determining distances.

The handheld distance measurement device according to the invention additionally preferably contains an inclination sensor for detecting at least one longitudinal inclination of the device. The determination of the position of the handheld distance measurement device in space can be ascertained in relation to the reference coordinate system fully automatically by means of the inclination sensor. All positional errors of the handheld distance measurement device can thereby be compensated for fully automatically. Optionally, a two-axis inclination sensor on the horizontal axis, a compass and/or a gyroscope can additionally be contained. A first alignment of the system can optionally be carried out on the basis of a compass or a GPS sensor.

As a result of the integration of additional components for determining angles, the distance measurement device according to the invention is able to measure not only distances but also horizontal and vertical solid angles. According to the invention, these components suitable for determining angles comprise an image acquisition unit having at least one camera and an image evaluation unit.

In one preferred embodiment, the handheld distance measurement device according to the invention has an image acquisition unit having at least two, especially at least three, cameras. In addition to the camera or the cameras of the image acquisition unit, the distance measurement device can have a target seeking camera having zoom functionality. Likewise, a camera of the image acquisition unit can optionally additionally perform a function as a target seeking camera.

The handheld distance measurement device according to the invention can ascertain distances between two points, without a reference point having to be directly accessible. The distance measurement device can thus represent the extent of the span between two arbitrary points that can be targeted by the laser spot. The handheld distance measurement device according to the invention can likewise be used as a goniometer and for displaying specific, for example user-defined, angles.

According to the invention, the image acquisition unit is configured to capture images of the measurement region around a currently targeted point, wherein a point that is visible or acquirable by the image acquisition unit can be generated on the targeted point by the distance measurement device. This acquirability by the image acquisition unit can be ensured for example by the use of a colored laser beam as measurement beam, or alternatively by a laser pointer—provided on the device in addition to the rangefinder emitting the measurement beam.

In this case, for performing the method according to the invention, the image acquisition unit captures at least two images in temporal association with a distance measurement in each case ("target images"). Capture in temporal association with a measurement is understood here to mean, in particular, capture taking place simultaneously with or directly before or after a measurement.

Combining the two target images—each imaging one of the two targeted points—by means of feature extraction generates a panoramic image on which both points are imaged. For this purpose, features in a captured image are acquired and matched with features of one or more further images.

For this purpose, the acquired features can preferably be tracked during camera panning by means of the targeting of a second point with the device, in particular wherein further images are acquired continuously or in a demand-oriented manner. For this purpose, in particular, it is also possible to use image stitching for generating the panoramic image.

Particularly if the two target images do not overlap or overlap only slightly, such that a feature extraction cannot be performed, or cannot be performed without errors, further images can be captured and used for generating the panoramic image.

In this case, each section, or each pixel or image point, of the panoramic image corresponds to a known angular segment dependent on the angular resolution of the respective camera optical unit. From the length of a section or a number of pixels between the two measurement points, it is thus possible to calculate the angle between the two alignments of the handheld distance measurement device during measurement with respect to the two points.

The angular distortion—defining the angle of the camera can be calibrated, in particular. In order not to corrupt the known value of the angular distortion, dispensing with a zoom functionality is expedient when acquiring an image used for indirect measurement. The camera—or the cameras—of the image acquisition unit can therefore preferably be embodied as fixed focus cameras. Alternatively, a camera having zoom functionality can be configured in such a way that, for acquiring an image used for indirect measurement, said camera is set fully automatically to a system-defined degree of zoom with known angular distortion. Likewise, during a measurement the respective degree of zoom can be detected and used for calculating the angular segment to which the pixel corresponds.

With an inclination sensor integrated in the distance measurement device, it is also possible to calculate indirectly measured horizontal distances and height differences.

In a first embodiment, the image acquisition unit has exactly one camera, which is preferably embodied as a fixed focus camera and designed to capture a plurality of images during a measuring process consisting of two distance measurements, said images being joined together by the image evaluation unit to form a panoramic image. Since the images are captured during a movement between the first and second distance measurements, the camera preferably has a fast optical unit with a short exposure time and/or a global shutter as aperture shutter in order to minimize blur effects.

Alternatively, the user can stop the movement for the purpose of image capture. The device can then give the user a corresponding signal if the movement is to be stopped for a further image capture. Such a signal can be effected for example optically, acoustically and/or by vibration. Under poor lighting conditions or if—such as, for example, on a planar white wall—not enough structures and features are available in order to join the images together unambiguously, auxiliary means such as a gyroscope, for example, can be used to support the image evaluation unit.

In a second embodiment, the image acquisition unit has a plurality of cameras. Preferably, said cameras are arranged on the distance measurement device such that, during the first distance measurement, they can simultaneously capture a wide-angle image of the desired working region, in particular at an angle of between 50° and 150°. A typical working region has an angle of 120°, for example. If the point targeted during the second distance measurement is situated in the wide-angle image captured during the first measurement, it suffices, during the second measurement, to capture a single image comprising the target point. If the point targeted during the second distance measurement is situated outside the wide-angle image captured during the first measurement, then a wide-angle image is also captured as the second image. The second image is then joined together with the wide-angle image of the first measurement to form a panoramic image. Thus, both measurement points are visible in said panoramic image, and, consequently, the angle can be calculated.

Advantages of an embodiment of the image acquisition unit having a plurality of cameras include, in particular, an improved accuracy during the static simultaneous capture of a wide-angle image by a plurality of cameras, a lower computational complexity as a result of fewer image combinations and less stringent requirements made of the capture region with regard to identifiable structures and features. Since the structure of the image between the two measurement points is unimportant, the method functions even with a white wall without identifiable features. It is only in the target region of the second measurement point that a structure must be acquirable in order to combine the wide-angle image with the second target image.

Under poor lighting conditions during the measuring process, in order to increase the accuracy, it is possible to use a stand for the distance measurement device or else to increase the integration time. With external aids such as an auxiliary laser pointer, for example, which is directed onto a region in proximity to the second target point and generates at least two acquirable points there, it is even possible to carry out measurements in darkness.

Preferably, the generated panoramic image can be used for extrapolating the measurement. As a result, by way of example, for measuring the width of a house wall, it is no longer necessary to measure exactly at the edges of said house wall, which can be difficult with a handheld device. Instead, after the measurement of two points near the edges in the panoramic image—displayed to the user for example on a touch screen of the device—a reticle can be inserted on the measurement points and can be drawn accurately to the edge by the user, as a result of which the indirectly measured distance can be correspondingly corrected. As an alternative or in addition to the reticles, it is possible to represent the distance in the image as a line which can be lengthened or shortened as necessary by the user. Likewise, it can preferably be possible for the user to carry out additional measurements on the basis of the panoramic image, and to store or export the images and thus make them usable for documentations.

The cameras of the image acquisition unit are preferably embodied as fixed focus wafer scale cameras, such as are usually already used in other handheld devices such as cellular phones, for example. On account of their compactness, wafer scale cameras are well suited to use in small handheld devices. In addition, the distance measurement device can have a target seeking camera having a zoom functionality, which although it has a smaller viewing angle, permits a better targeting accuracy.

Preferably, the image evaluation unit is additionally designed to ascertain, from the acquired images related to one another, an offset to the respective capture axes by means of image processing. In this regard, it is possible to ascertain a movement of the distance measurement device between the captures of the target images in the three translational degrees of freedom as well, thereby increasing inter alia the accuracy when calculating the extent of the span between two measurement points. Likewise, the laser rangefinder can preferably be configured to acquire further distances between the measuring processes—continuously and/or in a demand-oriented manner—which further distances can be included in the calculation for ascertaining the offset.

Furthermore, the handheld distance measurement device according to the invention can preferably mark out predefined coordinates relative to the first measurement point and signal them to the user. Likewise, the vertical position can be indicated from any arbitrary point by means of an optionally integrated inclination sensor. Areas of geometrical shapes that are situated in the space and are defined by at least three measurement points can be calculated automatically. Geometrical shapes can preferably automatically be fitted into a captured measurement image and their dimensions can be ascertained. With the captured measurement image, the measurement points can be shifted to the desired position, the measurement coordinates being extrapolated automatically.

BRIEF DESCRIPTION OF THE DRAWINGS

The handheld distance measurement device according to the invention and the measuring method according to the invention are described in greater detail purely by way of example below on the basis of concrete exemplary embodiments illustrated schematically in the drawings, wherein further advantages of the invention are also discussed. In the figures in specific detail.

DETAILED DESCRIPTION

Figure 1A:
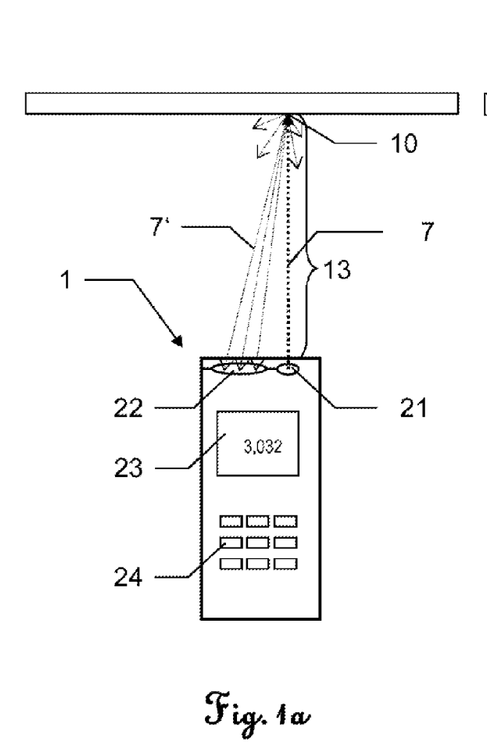
FIGS. 1a-b show a handheld distance measurement device according to the invention comprising a laser rangefinder.

FIG. 1a illustrates a generic handheld distance measurement device 1 for measuring distances in an exterior view. Said device has a housing, in which the required electronic components are arranged. In this case, the housing is embodied such that the distance measurement device 1 can be held in the hand and also placed or attached in a defined manner at a point to be measured. Corresponding bearing edges or swing-out or clip-on stop elements, such as are described for example in WO 02/50564, can be fitted on the housing for this purpose. The distance measurement device 1 comprises at its front side a laser rangefinder 20 having a laser emission unit 21 and a laser receiving unit 22, which have optical openings in the housing. A display device 23 in the form of a display and input means 24 in the form of a keypad are situated on the top side of the distance measurement device. Moreover, provision can be made of a target seeking camera—not illustrated here—having a zoom functionality for capturing images that can be displayed on the display device 23 in the direction of the emission direction.

According to the invention, the laser emission unit 21 emits a laser beam 7 to a measurement point 10 on a wall. The wall has a naturally rough surface from which optical rays are reflected in a scattering fashion. A portion of the rays 7' of the laser beam 7 that are reflected in a scattered fashion are collected by the laser receiving unit 22, detected and converted into an electrical signal. The signal is evaluated by an electronic circuit in a manner known per se in order to determine the digital value of the distance 13. By way of example, phase or time-of-flight measurement can be used for ascertaining distance. In this case, the extent between the laser receiving unit 22 and a measurement stop is also taken into account. The value of the measured distance 13 that is determined digitally by the evaluation is then made available to a user by the display device 23.

Figure 1B:
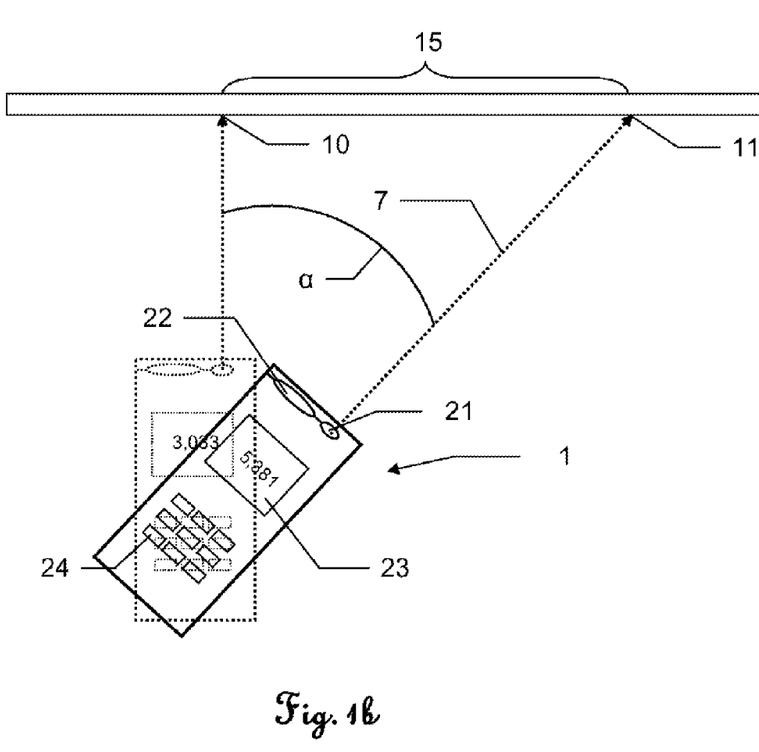

FIG. 1b shows the handheld distance measurement device 1 from FIG. 1a during the measurement of a distance to a first point 10 and to a second point 11 on a wall. For the measurement with respect to the second point 11, the position of the distance measurement device 1 is changed by the user relative to the measurement with respect to the first point 10, illustrated here as a rotation by the angle α. If said angle α can be detected in addition to the distances to the two points 10, 11, the section 15 between the two points 10, 11 can be calculated.

Figure 2:
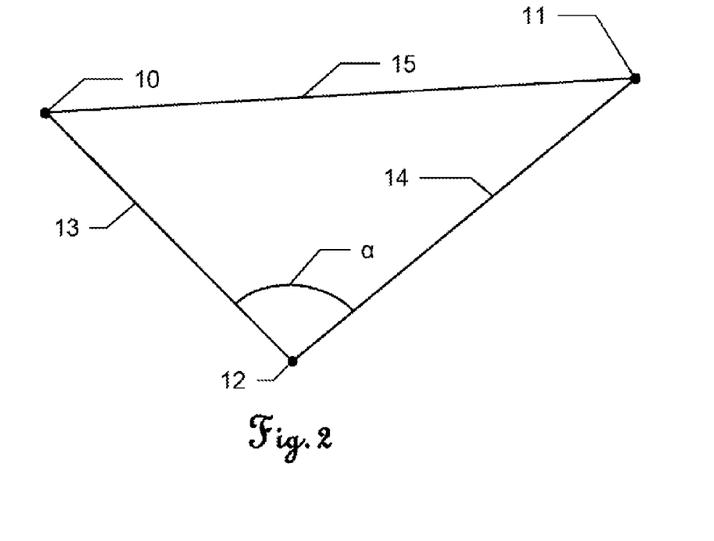
FIG. 2 shows the trigonometrical principles for calculating the distance between two remote target points.

FIG. 2 shows the trigonometrical principles of the method according to the invention. The length of a section 15 can be calculated by means of the known distances 13, 14 from an arbitrary spatial point to the end points 10, 11 of the section 15 and the angle α between the directions from the spatial point 12 to the end points 10, 11. The cosine law, in particular, can be used for this purpose.

Figure 3:
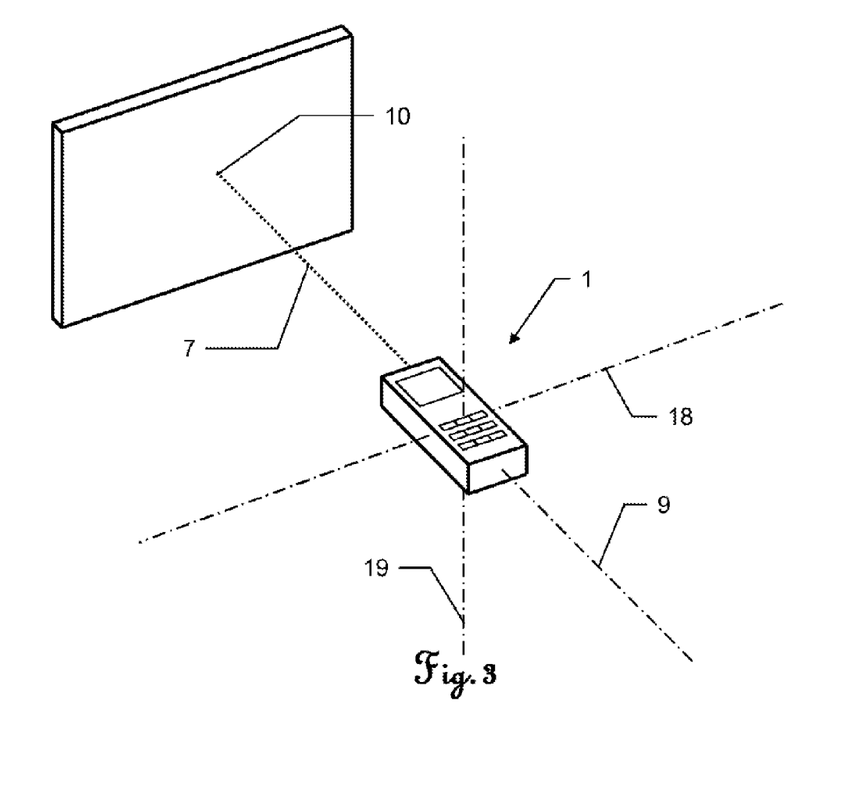
FIG. 3 shows a handheld distance measurement device according to the invention and the three rotation axes of the reference coordinate system.

FIG. 3 shows the handheld distance measurement device 1 according to the invention, which emits a laser beam 7 in a first emission direction 8 to a measurement point 10. The illustration also shows the rotation axes running orthogonally with respect to the emission direction 8: the transverse axis 18 and the vertical axis 19.

Figure 4:
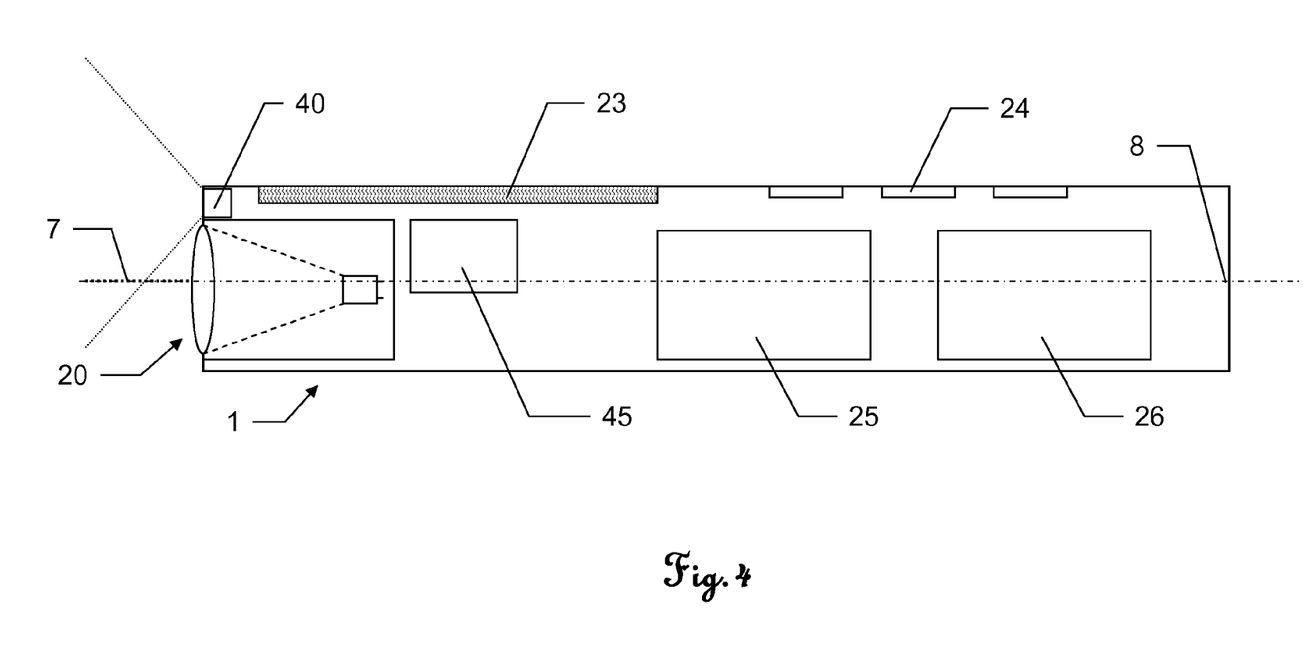
FIG. 4 shows a handheld distance measurement device according to the invention in a longitudinal sectional view.

FIG. 4 illustrates a longitudinal section through a handheld distance measurement device 1 according to the invention. The distance measurement device 1 comprises a laser rangefinder 20 with a laser beam 7 emitted in the emission direction 8. A display 23 and input means 24 are furthermore illustrated. An image evaluation unit 45, an evaluation component 25 and an inertial sensor 26 are shown as internal components. Moreover, the distance measurement device 1 contains an energy source (not illustrated), in particular a battery or a rechargeable battery, which provides electrical energy for the electrically operated components of the distance measurement device 1.

A distance value present digitally can—as is customary nowadays in the case of optically measured distances—be stored, processed further or transmitted by the evaluation component 25 of the device and can be displayed to a user on the display 23.

Figure 5A:
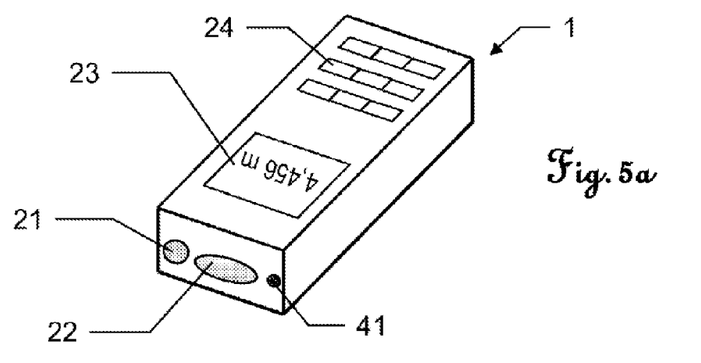
FIGS. 5a-c show a handheld distance measurement device according to the invention in three exemplary configurations with differently arranged cameras.
Figure 5B:
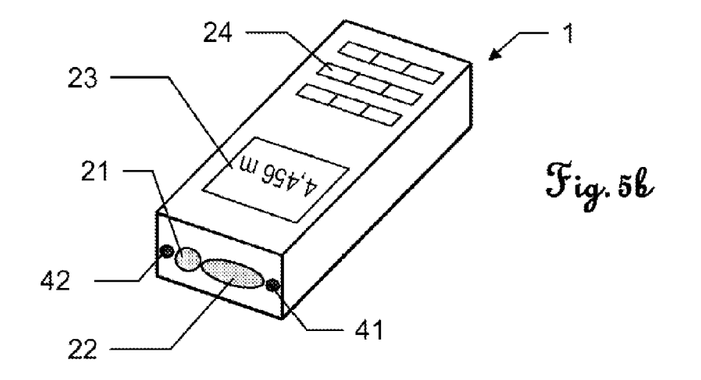
Figure 5C:
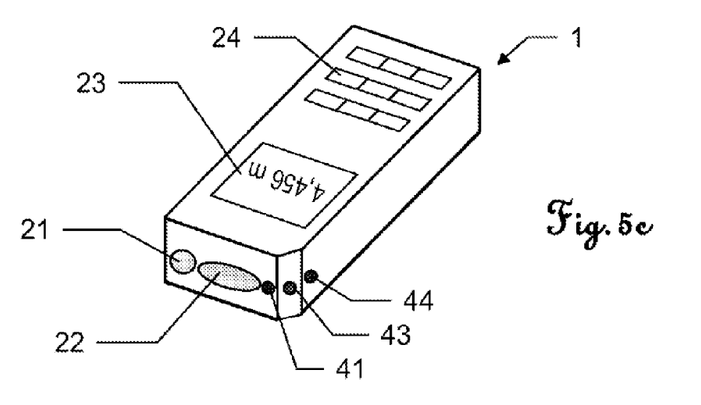

FIGS. 5a to 5c illustrate the handheld distance measurement device 1 according to the invention with three exemplary configurations of the image acquisition unit.

FIG. 5a shows a handheld distance measurement device 1 comprising an individual camera 41, arranged alongside the laser emission unit 21 and the laser receiving unit 22.

FIG. 5b shows a handheld distance measurement device 1 comprising a first camera 41, which is arranged on one side of the laser emission unit 21 and the laser receiving unit 22, and a second camera 42, which is arranged on the other side.

FIG. 5c shows a handheld distance measurement device 1 comprising three cameras 41, 43, 44, arranged on the same side of the laser rangefinder.

The cameras 41-44 of the image acquisition units shown in FIGS. 5a and 5b are configured in particular in such a way that they make it possible to generate a wide-angle image by simultaneous capture of an image. Diverse further camera arrangements can be implemented, which cannot be illustrated here for reasons of space; in particular, in each case a plurality of cameras can be arranged on both sides of the laser rangefinder 20, or cameras can be arranged above and/or below the laser rangefinder 20.

Figure 6A:
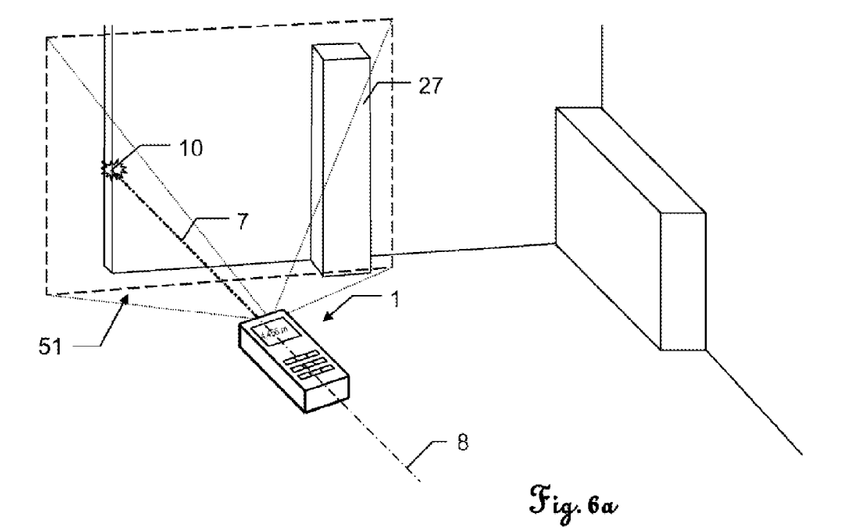
FIG. 6a shows a handheld distance measurement device according to the invention during the measurement of the distance to a first measurement point.
Figure 6B:
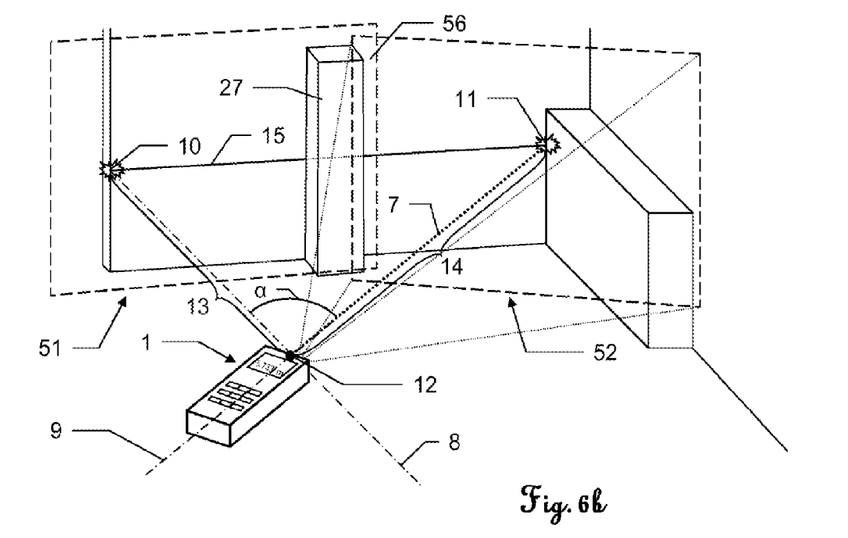
FIG. 6b shows a handheld distance measurement device according to the invention during the measurement of the distance to a second measurement point.

FIGS. 6a and 6b illustrate a method by means of which a distance measurement device 1 according to the invention can be used to ascertain the length of a section 15 between two remote measurement points 10, 11 on a surface, for example if—as illustrated here—an obstacle 27 prevents a direct measurement from a first point 10 to a second point 11.

FIG. 6a illustrates a handheld distance measurement device 1 according to the invention during the measurement of the distance to the first measurement point 10. The user aligns the measurement device 1 with the point 10 to be measured on the wall by means of the visible laser beam 7 and starts the measuring process via input means of the device 1. The laser rangefinder 20 detects the distance 13 to the point 10; said distance is stored by an evaluation unit of the device 1. Simultaneously, a camera of the image acquisition unit 40 captures a first target image 51 of the measurement environment. Said target image is stored by the image evaluation unit.

FIG. 6b illustrates the handheld distance measurement device 1 during the measurement with respect to the second measurement point 11. The user aligns the device 1 with a further point 11 to be measured on the wall by means of the visible laser beam 7 and starts the second measuring process. The laser rangefinder 20 detects the distance 14 to the second point 11, said distance being stored by the evaluation unit. Simultaneously, a camera of the image acquisition unit 40 captures a second target image 52 of the measurement environment, wherein the first and second target images have an overlapping common image region 56.

Said common image region 56 is used by the image evaluation unit to relate the first target image 51 and the second target image 52 to one another by feature extraction, in particular to combine them with one another to form a panoramic image by means of image stitching. For this purpose, the common image region 56 must have acquirable structures or other features. In this example, parts of the obstacle 27 are present as acquirable feature.

The target images 51, 52 are composed of image points, in particular pixels. Depending on the optical unit of the camera, each pixel represents an angular segment. By virtue of knowledge of the camera optical unit of the device, the size of said angular segment is also known and stored in a memory of the image evaluation unit.

From the images related to one another, or from the composite panoramic image, by ascertaining the number of pixels between the two measurement points 10, 11, it is therefore possible to calculate the angle $\alpha$ between the first emission direction 8 and the second emission direction 9. By means of triangulation, in particular by means of the cosine law, the distance 15 between the two points 10, 11 can then be calculated from the measured distances 13, 14 and the angle $\alpha$.

Figure 7A:
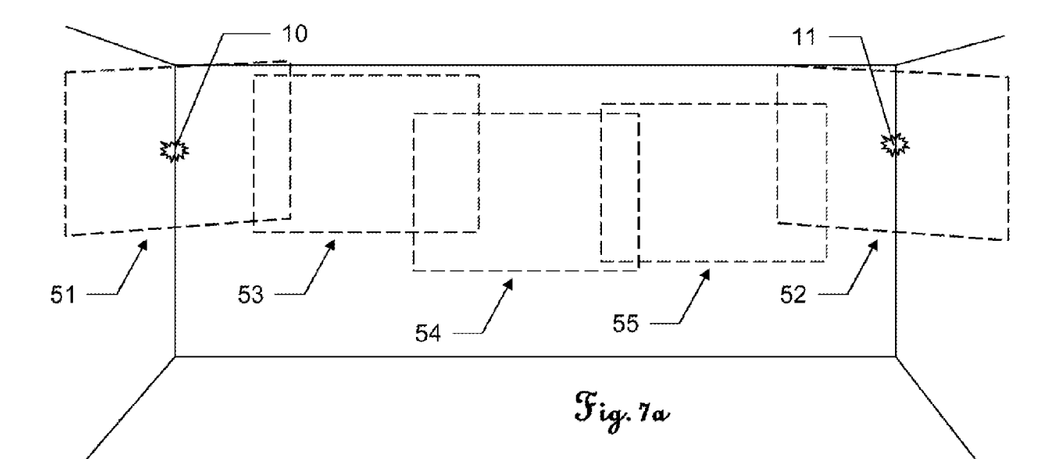
FIGS. 7a-b show the joining together of the target images and further acquired images.
Figure 7B:
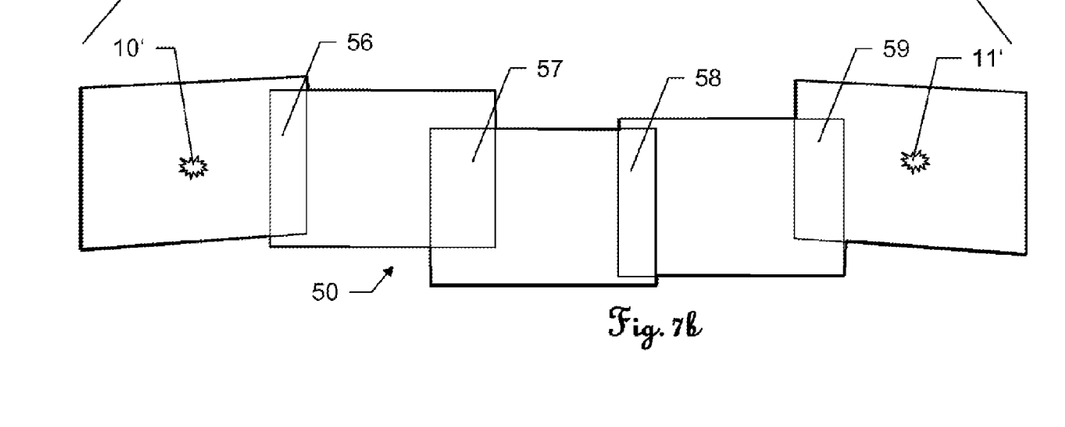

FIGS. 7a and 7b illustrate the joining together of a plurality of images 51-55 to form a panoramic image 50. Only a single camera is necessary for this method.

FIG. 7a illustrates a measurement environment in a space with two measured target points 10, 11. During the first and second measuring processes, a first target image 51 and a second target image 52 are acquired, which do not overlap in this example. Between the two measuring processes, three further images 53-55 are therefore acquired in order to bridge the distance between the two target images 51, 52. In this case, each of the acquired target and further images 51-55 has at least one common image region with the respectively adjoining images, and these overlaps are distributed such that, by virtue of the images 51-55, there is a continuously imaged connection between the two target points 10, 11.

FIG. 7b illustrates the joining together of the individual images from FIG. 7a to form a single panoramic image 50 by means of image stitching. This is made possible by identification and combination of features in the common image regions 56-59 of the individual images by means of image processing. As a result of this joining together of the individual images, the imagings 10', 11' of the two target points are brought together in the same panoramic image 50.

Figure 8:
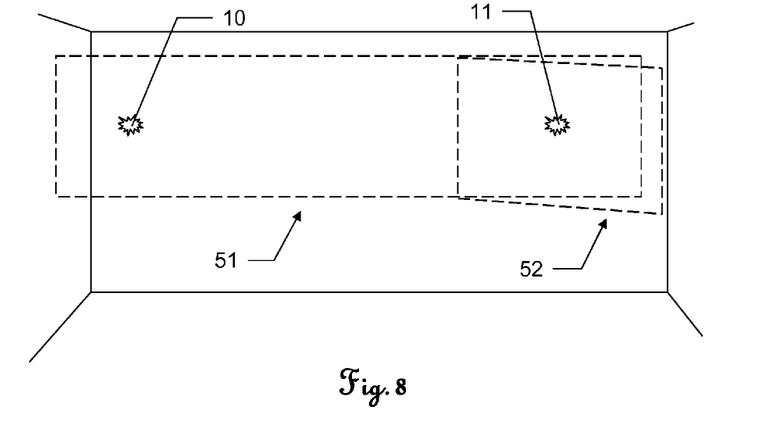
FIG. 8 shows the joining together of a first target image captured as a wide-angle image with a second target image.

FIG. 8 illustrates the joining together of a wide-angle image as a first target image 51 with a second target image 52. For capturing a wide-angle image, the handheld distance measurement device preferably has a plurality of cameras that simultaneously capture an image that taken together can encompass in particular an angular range of at least 120°. In the case of three cameras having an angular range of 50°, by way of example, an angular range of up to 150° can be detected simultaneously. During the first measuring process with respect to the first target point 10, such a wide-angle image is acquired as a first target image 51. Since, in this example, besides the first target point 10, the second target point 11 to be measured subsequently also lies in the image region of the wide-angle image, it suffices to acquire an individual image as a second target image 52. As a result, the two target images 51, 52 automatically have a common image region and can be combined with one another to form a panoramic image by means of image stitching (as shown in FIG. 7b).

Figure 9:
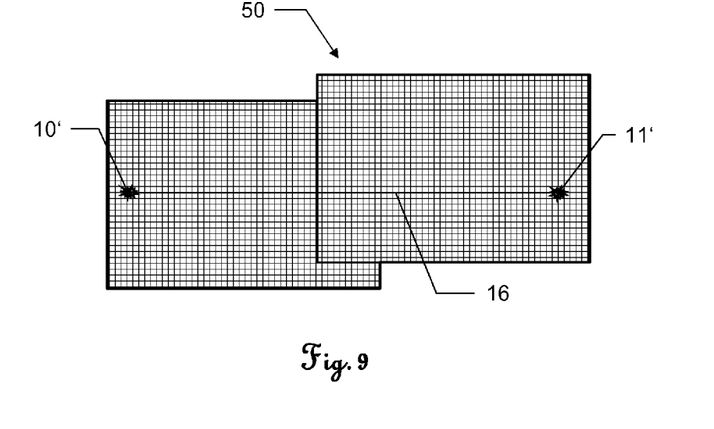
FIG. 9 shows the determination of an angle on the basis of image information.

FIG. 9 shows a panoramic image 50 joined together from two target images with an imaging 10' of the first target point 10 and an imaging 11' of the second target point 11. For deriving the angle $\alpha$ between the two emission directions during the measurements with respect to these spatial points it is possible—assuming that the angular distortion of the camera optical unit is known—to use a distance 16 between the representations 10', 11' of the two target points in the panoramic image 50. This distance 16 in the imaging can be ascertained in particular by counting the pixels between the two representations 10', 11', wherein each pixel of the panoramic image 50 corresponds to a known angular segment, dependent on the respective optical unit. From the distance 16 or the number of pixels between the two representations 10', 11' of the target points in the panoramic image 50, it is therefore possible to calculate the angle $\alpha$ and thus also the real distance between the two target points. If a value for the known angular distortion of the optical unit is stored in an evaluation component of the distance measurement device, the calculation of the angle $\alpha$ can be carried out fully automatically.

Figure 10:
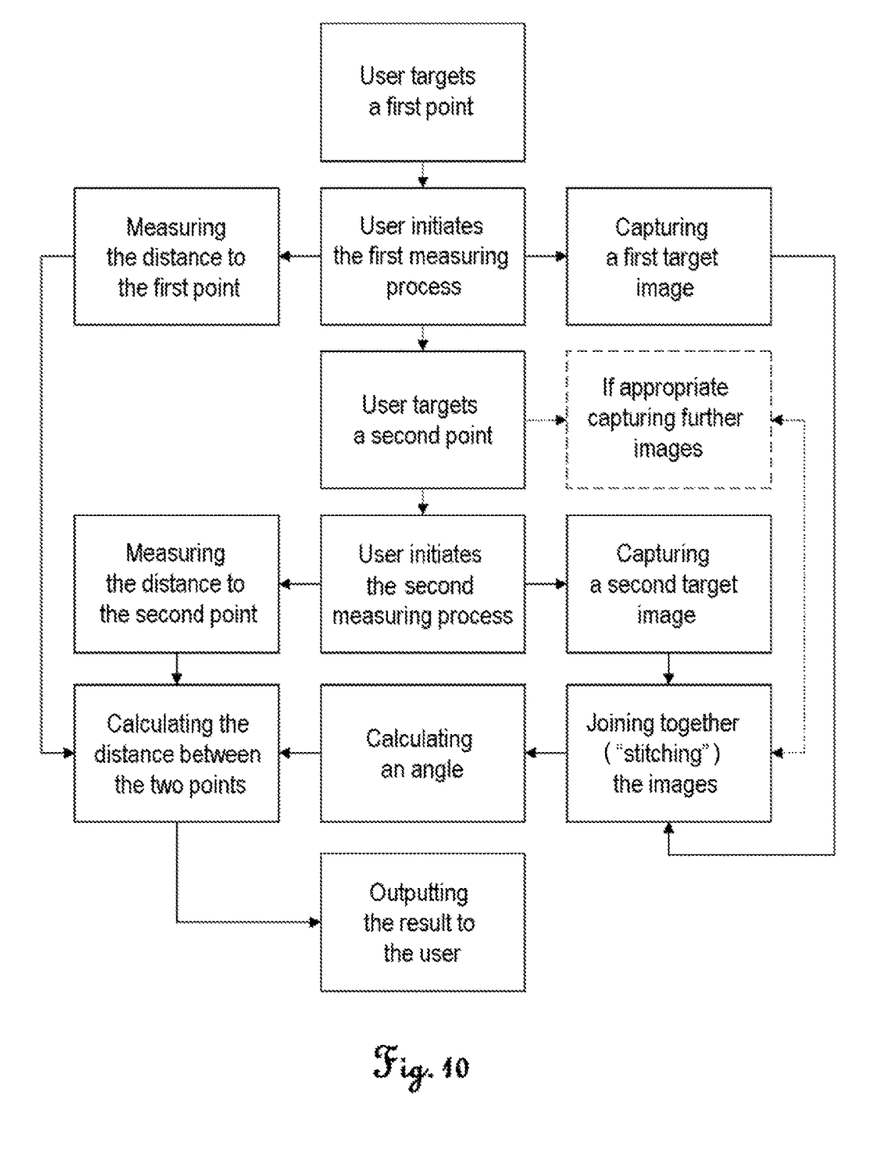
FIG. 10 shows a flowchart for illustrating a method according to the invention for measuring the distance between two remote target points.

FIG. 10 shows a flowchart illustrating individual steps—proceeding after the start of the method—of an exemplary measuring method according to the invention using a distance measurement device 1 shown in the previous figures. In order to start the method, the user firstly aims at the first measurement point 10 with the laser beam 7 of the distance measurement device 1 and initiates the measuring process via the input means 24 of the device. The evaluation unit 25 ascertains and stores the values ascertained by the laser rangefinder 20 for the distance 13—and possibly the values ascertained by an initial sensor 26 for the inclination of the distance measurement device 1. The image acquisition unit 40 captures, in particular simultaneously with the distance measurement, a first target image 51 on which the first measurement point 10 is acquirable. An image evaluation unit 45 stores the target image 51 captured by the image acquisition unit 40.

The user subsequently targets the second measurement point 11 and pivots the distance measurement device 1 for this purpose. During targeting, the image acquisition unit 40 captures further images 53-55, if appropriate, in order to ensure that the target images 51, 52 can be joined together later as a result of the generation of image regions 56-59 common to a plurality of images. In particular, the image acquisition unit 40 is designed here to identify fully automatically whether a further image 53-55 must be acquired for joining together the target images 51, 52 later, and to acquire said further image fully automatically.

With the renewed initiation of a measuring process with respect to the second measurement point 11 by the user, the evaluation unit 25 ascertains and stores a further distance 14—and possibly also an inclination. In particular simultaneously with the measurement, a second target image 52 is captured by the image acquisition unit 40.

The image evaluation unit 45 joins together the target images 51, 52 and possibly further images 53-55 to form a panoramic image 50 by means of image stitching. For this purpose, it is able to recognize structures or features in the common image regions 56-59 of the images 51-55 by means of image recognition.

If not enough images with sufficient common image regions 56-59 have been captured for image stitching, then after a second measuring process the user can also be requested to align the distance measurement device 1 for further captures by the image acquisition unit 40, and be guided for example by the display 23 of the device to one or more specific alignments in which one or more further images 53-55 must be captured in order to enable image stitching.

If the images 51-55 have been joined together by the image evaluation unit 45, the latter can calculate an angle α from the distance 16 between the two imagings 10', 11' of the measurement points 10, 11—in particular determined by the number of pixels—and a known angular range of the individual pixels, which is dependent on the optical unit of the cameras 41-44 of the image acquisition unit 40. This is the angle between the two emission directions 8, 9 during the two distance measurements with respect to the measurement points 10, 11. By means of the cosine law, the evaluation unit 25 can calculate the distance 15 between the two measurement points 10, 11 from the two measured distances 13, 14 and the calculated angle α. The result can then be output to the user via the display 23.

It goes without saying that these illustrated figures merely illustrate possible exemplary embodiments schematically. The different approaches can likewise be combined with one another and with methods and devices from the prior art.

What is claimed is:

1. A method for ascertaining geometrical data in a space with a measurement sequence comprising:
   measuring a first distance to a first target point by emitting a laser beam in a first emission direction;
   measuring a second distance to a second target point by emitting a laser beam in a second emission direction;
   acquiring a series of images using a handheld device comprising at least two cameras, each having a camera optical unit with known properties, the series of images having at least one first target image and a second target image, wherein the images have at least one common image region, and a first target image with an imaging of the first target point and at least one further image are acquired simultaneously with measuring the first distance, and a second target image with an imaging of the second target point and at least one further image are acquired simultaneously with measuring the second distance;
   joining together the acquired images to form a panoramic image using feature extraction and image stitching and using the at least one common image region;
   determining a distance between the imaging of first the target point and the imaging of the second target point in the panoramic image on the basis of a number of image points between the imaging of the first target point and the imaging of the second target point,
   calculating a distance between the first target point and the second target point on the basis of the first distance, the second distance, the distance between the imagings of the first target point and the second target point, and the known properties of the camera optical unit, and
   displaying the distance between the first target point and the second target point on a display of the handheld device,
   wherein the measuring of the first distance, measuring of second distance, joining, determining, and calculating are performed with the handheld device configured as a distance measurement device.

2. The method as claimed in claim 1 wherein determining the distance between the imagings of the target points in the images related to one another is carried out on the basis of a number of pixels between the imagings of the target points.

3. The method as claimed in claim 1, wherein acquiring the first target image is carried out substantially in the direction of the first emission direction and acquiring the second target image is carried out substantially in the direction of the second emission direction.

4. The method as claimed in claim 1, wherein the geometrical data comprise a solid angle between the first emission direction and the second emission direction, the method further comprising calculating a distance between the first target point and the second target point using a cosine law and using the measured distances to the target points and the solid angle (a) between the first emission direction and the second emission direction.

5. The method as claimed in claim 4, wherein
   a horizontal plane is defined on the basis of the coordinates of a target point, and a distance between a second target point and said plane is ascertained; and/or
   on the basis of the coordinates of the at least two target points, a course of a straight line through two target points is ascertained, and a distance between a third target point or a parallel line defined by a third target point and said straight line is optionally ascertained.

6. A handheld distance measurement device comprising:
   a laser rangefinder for measuring distances to target points using a laser beam emitted in an emission direction;
   an evaluation component for deriving and providing the measured distances; and
   an image acquisition unit comprising at least two cameras for acquiring a series of images, each of the at least two cameras having a camera optical unit with known properties,
   wherein the series of images comprises target images which are acquired in temporal association with a measurement of a distance to a target point, such that they can be combined with said distance, and have an imaging of the target point,
   wherein the distance measurement device has an image acquisition and evaluation functionality in the context of which the image acquisition unit acquires a series of images which has at least one first target image and one second target image and in which each of the images has a common image region with at least one further image, wherein the image acquisition unit is configured to acquire a first target image and at least one further image of the series of images simultaneously with a first measurement of a first distance to a first target point in the first emission direction, and to acquire a second target image and at least one further image of the series of images simultaneously with a second measurement of a second distance to a second target point in the second emission direction;
   an image evaluation unit of the distance measurement device relates the first target image and the second target image to one another by evaluating the images of the series using image processing, and determines a distance between the imaging of a first target point in the first target image and the imaging of a second target point in the second target image on the basis of a number of image points between the imaging of the first target point and the imaging of the second target point,
   the evaluation component is configured for calculating a distance between the first target point and the second target point on the basis of the first distance and the second distance, the distance between the imagings of the first target point and second target point, and the known properties of the camera optical units, and the evaluation component is configured to display the distance between the first target point and the second target point on a display of the handheld distance measuring device.

7. The handheld distance measurement device as claimed in claim 6, wherein
the first target image and the second target image each have a common image region with a further acquired image of the series, and/or
the first target image and the second target image each have a common image region with a continuous sequence of further acquired images of the series, said sequence being defined by common image regions.

8. The handheld distance measurement device as claimed in claim 6, wherein
the image acquisition unit is configured to acquire images in the direction of an emission direction.

9. The handheld distance measurement device as claimed in claim 8, wherein the image acquisition unit is configured to acquire target images as wide-angle images, wherein the wide-angle images include an angle greater than 120°.

10. The handheld distance measurement device as claimed in claim 6, wherein
the image evaluation unit is configured to determine in the images a distance between the of two target points on the basis of a number of pixels between the imagings of the target points.

11. The handheld distance measurement device as claimed in claim 6, wherein
the evaluation component is configured for calculating the distance between the first target point and the second target point using the cosine law and using the measured distances to the target points and a solid angle between the first emission direction and the second emission direction.

12. The handheld distance measurement device as claimed in claim 6, further comprising:
a target seeking camera having a zoom functionality; and
a touch-sensitive display for displaying images captured using the at least one camera of the image acquisition unit;
joined-together panoramic images;
measured distances, calculated distances and solid angles, and/or
a live image captured by the target seeking camera.

13. A non-transitory computer program product comprising program code, stored on a machine-readable carrier, for performing the method of claim 1.

14. The method as claimed in claim 1, wherein the known properties comprise an angular distortion of the camera optical unit.

15. The handheld distance measurement device as claimed in claim 6, wherein the known properties comprise an angular distortion of the camera optical unit.

16. A method for ascertaining geometrical data in a space with a measurement sequence comprising:
measuring a first distance to a first target point by emitting a laser beam in a first emission direction;
measuring a second distance to a second target point by emitting a laser beam in a second emission direction;
acquiring a series of images using at least one camera having a camera optical unit with known properties, the series of images having at least one first target image and a second target image, wherein the images have at least one common image region, and at least one first target image with an imaging of the first target point is acquired simultaneously with measuring the first distance, and one second target image with an imaging of the second target point is acquired simultaneously with measuring the second distance;
determining whether the at least one common image region is sufficient for joining together the acquired images to form a panoramic image using feature extraction and image stitching and using the at least one common image region;
determining one or more specific alignments of the at least one camera at which one or more further images must be captured in order to enable image stitching;
providing on a display a request to a user to move the at least one camera to the one or more specific alignments;
capturing, in the one or more specific alignments, one or more further images using the at least one camera;
joining together the acquired images to form a panoramic image using feature extraction and image stitching and using the at least one common image region and the one or more further images;
determining a distance between the imaging of the first target point and the imaging of the second target point in the panoramic image on the basis of a number of image points between the imaging of the first target point and the imaging of the second target point,
calculating a distance between the first target point and the second target point on the basis of the first distance and the second distance and on the basis of the distance between the imagings of the target points, and using the known properties of the camera optical unit, and
displaying the distance between the first target point and the second target point on a display of the handheld device configured as a distance measurement device.

17. The method as claimed in claim 16, comprising displaying guidance for a user to move the at least one camera to the one or more specific alignments.

18. A handheld distance measurement device comprising:
a laser rangefinder for measuring distances to target points using a laser beam emitted in an emission direction;
an evaluation component for deriving and providing the measured distances;
an image acquisition unit comprising at least one camera for acquiring a series of images, the at least one camera having a camera optical unit with known properties, and
a touch-sensitive display for displaying images captured using the at least one camera of the image acquisition unit and measured or calculated distances, wherein the series of images comprises target images which are acquired in temporal association with a measurement of a distance to a target point, such that they can be combined with said distance, and have an imaging of the target point,
wherein the distance measurement device has an image acquisition and evaluation functionality in the context of which:
the image acquisition unit acquires a series of at least two images which has at least one first target image and one second target image and in which each of the images has a common image region with at least one further image,
an image evaluation unit of the distance measurement device
forms a panoramic image by joining together the first target image and the second target image by evaluating the images of the series using image processing and determines a distance between the imaging of a first target point in the first target image and the imaging of a second target point in the second target image on the basis of a number of image points between the imaging of the first target point and the imaging of the second target point, and the evaluation component is configured for calculating a distance between the first target point and the second target point on the basis of the first distance and the second distance, on the basis of the distance between the imagings of the target points, and using the known properties of the camera optical unit, wherein the image evaluation unit is further adapted to determine whether the at least one common image region is sufficient for image stitching to join together the acquired images to form a panoramic image using feature extraction and the at least one common image region;

to determine one or more specific alignments of the at least one camera at which one or more further images must be captured in order to enable image stitching; and to trigger providing on the display a request to a user to move the at least one camera to the one or more specific alignments, and the evaluation component is configured to display the distance between the first target point and the second target point on a display of the handheld distance measuring device.

\* \* \* \* \*